United States Patent [19]

Davies

[11] Patent Number: 5,434,897
[45] Date of Patent: Jul. 18, 1995

[54] HYDRIDE DAMAGE RESISTANT FUEL ELEMENTS

[75] Inventor: John H. Davies, San Jose, Calif.

[73] Assignee: General Electric Company, San Jose, Calif.

[21] Appl. No.: 215,450

[22] Filed: Mar. 21, 1994

[51] Int. Cl.⁶ .................................. G21C 3/00
[52] U.S. Cl. ........................ 376/416; 376/457; 376/417; 376/414
[58] Field of Search ............... 376/416, 457, 417, 414, 376/428, 444; 976/DIG. 43, DIG. 53; 148/281

[56] References Cited

U.S. PATENT DOCUMENTS

| | | | |
|---|---|---|---|
| 2,849,387 | 8/1958 | Brugmann | 376/414 |
| 3,620,691 | 11/1971 | Rubel | 29/191 |
| 4,111,748 | 9/1978 | Hayashi et al. | 376/412 |
| 4,131,368 | 12/1978 | Iddon | 366/81 |
| 4,576,654 | 3/1986 | Eddens et al. | 148/11.5 F |
| 4,894,203 | 1/1990 | Adamson | 376/416 |
| 5,069,888 | 12/1991 | Larson et al. | 423/260 |
| 5,225,154 | 7/1993 | Kanno et al. | 376/416 |
| 5,247,550 | 9/1993 | Perkins et al. | 376/416 |
| 5,297,177 | 3/1994 | Inagaki et al. | 376/462 |

OTHER PUBLICATIONS

Proebstle, R. A.; Davies, J. H.; Rowland. T. C.; Rutkin, D. R.; and Armijo, J. S., "The Mechanism of Defection of Zircaloy-clad Fuel Rods by Internal Hydriding", GE Reference No. NEDO-20684 75NED16 dated, Apr. 1975.

Davies, John R., "Secondary Damage in LWR Fuel Following PCI Defection—Characteristics and Mechanisms", paper presented at IAEA specialists Meeting, Chalk River, Ontario, Canada, Sep. 16–20, 1979.

Mogard, H.; "Suppression of PCI Induced Defects by Lightly Undulating the Bore Surface of the Fuel Cladding," ANS Topical Meeting, St. Charles, Illinois, May 9–11, 1977.

Mogard, H.; Grounes, M.; and Tomani, H., "Irradiation Investigation of the Initial Phase of Degradation of BWR Type Fuel Rodlets containing Simulated Single Fretting Clad Defects", Enlarged Halden Programme Group Meeting, Bolkesjo, Norway, Jun. 9–14, 1991.

Kjaer-Petersen, N.; and Mogard, H., "In-Reactor Performance of Fuel with Rifled Cladding," American Nuclear Society Topical Meeting on LWR Fuel Performance, pp. 284, Williamsburg, Virginia, Apr. 17–20, 1988.

Primary Examiner—Donald P. Walsh
Assistant Examiner—Meena Chelliah
Attorney, Agent, or Firm—James E. McGinness; Jeffrey K. Weaver

[57] ABSTRACT

A cladding tube is provided having an axis and a cross-section perpendicular to the axis. The cross-section includes (1) an outer circumferential substrate having an inner surface, (2) a zirconium barrier layer bonded to the inner surface of the outer circumferential substrate, and (3) an inner circumferential liner bonded to the inner surface of the zirconium barrier layer. The inner circumferential liner includes a plurality of facets aligned substantially in parallel with the cladding tube axis. The facets—which define the geometry of the cladding interior—facilitate mixing among the gases in the cladding interior. Also provided is a fuel element including (1) a cladding tube having an faceted inner liner as described above, (2) nuclear fuel material disposed within said cladding tube in a fuel region, and (3) a plenum or plenums located in one or both end regions (beyond the nuclear fuel region) within the cladding tube. In the event of steam entering the cladding interior, the plenum(s) serves as a reservoir making steam available to dilute locally high hydrogen/steam regions. At least a portion of the nuclear fuel is a uranium dioxide having an oxygen to uranium mole ratio in excess of 2.

17 Claims, 3 Drawing Sheets

HYDRIDE DAMAGE RESISTANT FUEL ELEMENTS

This invention relates to cladding fuel elements for use in nuclear reactors. More particularly, the invention relates to three-layer cladding having facets on the interior surface. The invention also relates to fuel rods having fuel with a stoichiometric excess of oxygen.

BACKGROUND OF THE INVENTION

Nuclear reactors have their fuel contained in sealed cladding for the isolation of the nuclear fuel from the moderator/coolant system. The term cladding, as used herein, refers to a zirconium based alloy tube. Often the cladding will be composed of various layers including a zirconium alloy substrate and an unalloyed zirconium barrier.

The cladding—nominally in the order of 0.030 inches thick—is formed in the shape of a tube with the nuclear fuel contained typically in pellet form therein. These pellets are stacked in contact with one another for almost the entire length of each cladding tube, which cladding tube is in the order of 160 inches in length. Typically, the cladding tube is provided with springs for maintaining the axial position of the fuel pellets and some designs include so-called "getters" for absorbing hydrogen. The internal portions of the fuel rod are pressurized with helium to help conduct the heat from the fuel material to the cladding.

Zirconium and its alloys, under normal circumstances, are excellent for nuclear fuel cladding since they have low neutron absorption cross sections and, at temperatures below about 350° C., are strong, ductile, extremely stable and relatively nonreactive in the presence of demineralized water or stem. "Zircaloys" are a family of corrosion-resistant zirconium alloy cladding materials. They are composed of 98–99% by weight zirconium, with the balance being tin, iron, chromium, and nickel. "Zircaloy-2" and "Zircaloy-4" are two widely-used zirconium-based alloys for cladding.

Zircaloy cladding defects may occur due to various causes including debris induced fretting and pellet-cladding interaction. In the first of these, debris lodges next to the cladding and vibrates or frets against the cladding wall under the influence of the passing steam/water mixture. Such vibration continues until the cladding wall is penetrated. Pellet-cladding interaction is caused by the interactions between the nuclear fuel, the cladding, and the fission products produced during the nuclear reaction. It has been found that this undesirable effect is due to localized mechanical stresses on the fuel cladding resulting from differential expansion and friction between the fuel and the cladding in coincidence with corrosive fission product species causing stress corrosion cracking.

To combat defects due to pellet-cladding interaction, some cladding includes pure zirconium barrier layers metallurgically bonded to the inner surface of the tubing. The pioneering work on bamer layer cladding is described in U.S. Pat. Nos. 4,200,492 and 4,372,817 to Armijo and Coffin, U.S. Pat. No. 4,610,842 to Vannesjo, and U.S. Pat. No. 4,894,203 to Adamson, each of which is incorporated herein by reference for all purposes. Barrier layers have been found to effectively prevent damage to the cladding due to interaction with the pellet. However, if the cladding wall is compromised in some manner (e.g. perforated by debris fretting), and water enters the fuel rod interior, the protection afforded by the barrier layer can be reduced. This is because the steam produced by water within the fuel rod can oxidize the barrier layer.

To protect the zirconium barrier from oxidation should a cladding breach occur, a three layer structure may be employed. See e.g., U.S. patent application Ser. No. 08/091,672 entitled METHOD FOR MAKING FUEL CLADDING HAVING ZIRCONIUM BARRIER LAYERS AND INNER LINERS and U.S. Pat. 5,341,407 issued Aug. 23, 1994. entitled INNER LINERS FOR FUEL CLADDING HAVING ZIRCONIUM BARRIER LAYERS, both of which were filed on Jul. 14, 1993, assigned to the assignee hereof, and incorporated herein by reference for all purposes. Such structures include a corrosion resistant inner liner bonded to the fuel side of the barrier. Unfortunately such linings may still be susceptible to a condition known as localized hydriding which can lead to secondary defects in the cladding.

After a fuel element has suffered a primary breach, it can still be used for some period of time in a reactor. However, if a "secondary failure" occurs as a result of coolant entering through the primary breach, the fuel element may have to be taken out of service. It has been observed that secondary failures are often much worse than the primary failures. Post-mortem studies of fuel rods indicate that the secondary failures are often due to localized hydriding of the cladding.

The primary breach in the cladding walls leads to ingress of water which instantly flashes to form steam. Some of the steam most likely reacts with the zirconium on the inner surface of the cladding to give off hydrogen. This is the hydrogen which leads to the formation of the secondary hydride failures.

Normally, zirconium metal is covered with a thin protective layer of zirconium oxide which protects against hydride formation. If this protective zirconium oxide layer is compromised (as by, for example, a scratch), the oxygen and/or steam in the surrounding atmosphere tends to immediately regenerate the protective zirconium oxide over the compromised area. If, for some reason, the zirconium oxide protective layer is not regenerated, the compromised site may support formation of a hydride. If this occurs, a protective zirconium oxide layer can no longer be formed over the hydride site. Thus, the hydride will continue to grow and damage the cladding as long as sufficient quantities of hydrogen gas are present in the environment.

In the environment within a fuel cladding after a primary breach, a condition known as "oxygen starvation" sometimes results. This condition is most often brought about when the ratio of hydrogen to steam increases beyond an "oxygen starvation" level. At this point, there is insufficient oxygen in the environment to regenerate the zirconium oxide protective layer when it becomes defective or when a bare zirconium region is exposed. Thereafter, the hydrogen will permeate the defective oxide or react at the bare zirconium site to generate hydrides. The brittle zirconium hydride takes up more volume than the pure zirconium. This leads to formations on the cladding variously characterized as hydride "bulges", "blisters", "sunbursts".

It follows that if a high ratio of steam to hydrogen in the cladding interior could be maintained along the axial length of the fuel rod (i.e., if oxygen starvation conditions could be prevented or delayed), secondary hydride damage and the resulting fuel degradation could be ameliorated. Thus, there exists a need for cladding that has the benefits of bilayer cladding while resisting formation of hydride defects in the event of a primary cladding breach.

SUMMARY OF THE INVENTION

This invention provides a cladding tube having an axis and a cross-section perpendicular to the axis. The cross-section includes (1) an outer circumferential substrate having an inner surface, (2) a zirconium barrier layer bonded to the inner surface of the outer circumferential substrate, and (3) an inner circumferential liner bonded to the inner surface of the zirconium barrier layer. The inner circumferential liner includes a plurality of facets aligned substantially in parallel with the cladding tube axis. The facets—which define the geometry of the cladding interior—facilitate mixing among the gases in the cladding interior. In the event that steam enters the cladding interior through a primary defect, the cladding of this invention will promote mixing of the steam and hydrogen to minimize the incidences of local hydrogen to steam ratios becoming high enough to cause oxygen starvation.

In a preferred embodiment, the inner liner is faceted in such a manner that the cladding interior is defined by a many-sided polygon. However, in alternative embodiments, the inner liner may have grooves or other channels which allow the steam to be transported along the length of the cladding tube.

One aspect of the invention provides a fuel element including (1) a cladding tube having an faceted inner liner as described above, (2) nuclear fuel material disposed within said cladding tube in a fuel region, and (3) a plenum or plenums located in one or both end regions (beyond the nuclear fuel region) within the cladding tube. In the event of steam entering the cladding interior, the plenum(s) serves as a reservoir making steam available to dilute locally high hydrogen/steam regions. In preferred embodiments, at least a portion of the nuclear fuel is a uranium dioxide having a stoichiometric excess of oxygen; having an oxygen to uranium mole ratio of between about 2 and 2.2; preferably having an oxygen to uranium mole ratio of between about 2.02 and 2.06.

Another aspect of this invention provides a fuel element in which the fuel region of the cladding interior is divided into three regions along the cladding axis, including two fuel end regions filled with nuclear fuel having a stoichiometric excess of oxygen, and a central region filled with stoichiometric nuclear fuel. Preferably, the stoichiometric nuclear fuel is separated from the nuclear fuel having a stoichiometric excess of oxygen by one or more barren that block diffusion between the nuclear fuel in the central region and nuclear fuel in the two fuel end regions. One suitable barrier is alumina.

These and other features of the present invention will be presented in more detail in the following specification of the invention and the figures.

DESCRIPTION OF THE PREFERRED EMBODIMENTS

I. THE FUEL ELEMENT STRUCTURE

As used herein, the term "tubing" refers to a metal tube having various uses, and the term "fuel rod container" or simply "container" refers to tubing used in fuel rods to enclose fuel pellets. Sometimes the fuel rod container is referred to as "cladding" or "cladding tube".

Figure 1:
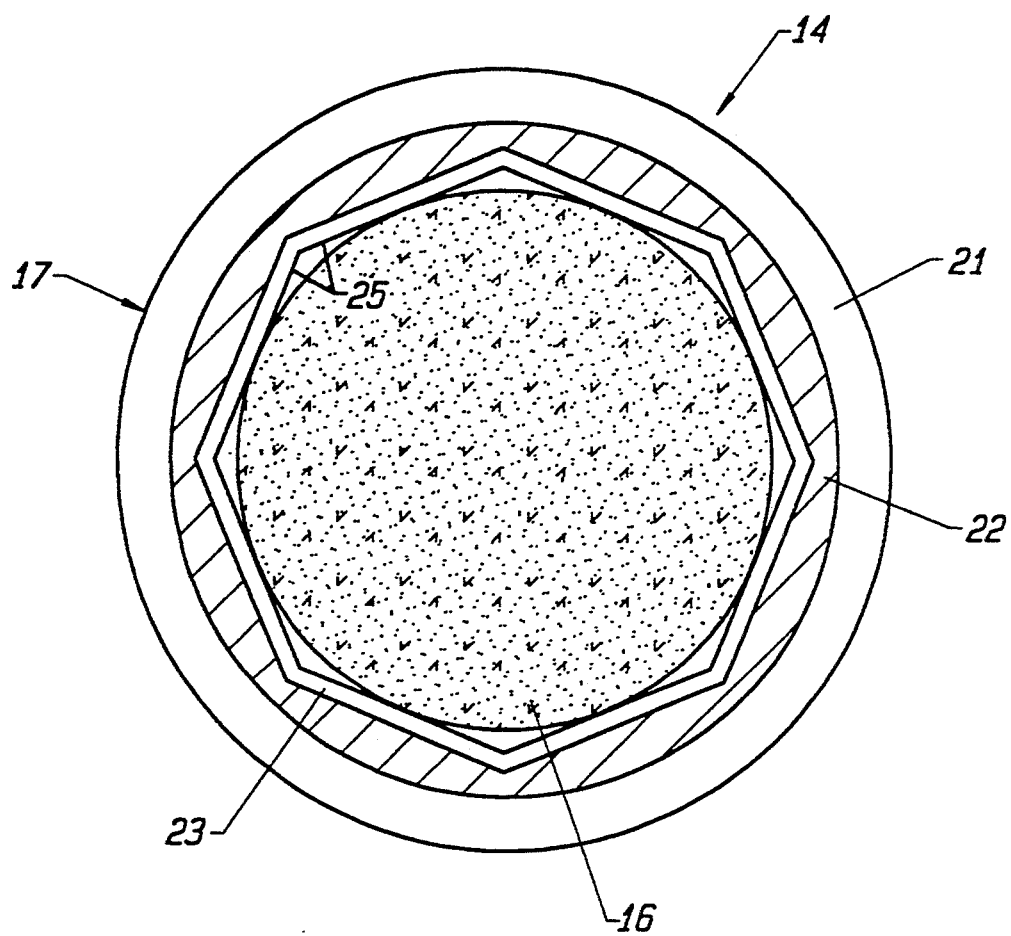
FIG. 1 is a cross sectional view of a nuclear fuel element of this invention having a substrate, a barrier layer, and a faceted inner liner.

Referring to FIG. 1, a fuel element 14 (commonly referred to as a fuel rod) includes a fuel rod container 17 surrounding a fuel material core 16. The fuel element 14 is designed to provide excellent thermal contact between the fuel rod container 17 and the fuel material core 16, a minimum of parasitic neutron absorption, and resistance to bowing and vibration which is occasionally caused by flow of coolant at high velocity. The fuel material core is typically a plurality of cylindrical fuel pellets of fissionable and/or fertile material. Various nuclear fuels may be used, including uranium compounds, thorium compounds and mixtures thereof. A preferred fuel is uranium dioxide or a mixture comprising uranium dioxide and plutonium dioxide.

The container 17 is a composite cladding having a structure including a substrate 21, a zirconium barrier 22, and an inner layer or liner 23. The substrate forms the outer circumferential region of a cladding tube, the inner liner forms an inner circumferential region defining the interior geometry of the cladding tube, and the zirconium barrier is located between the substrate and inner liner. The inner liner contains a plurality of facets 25 to assist in mixing gases in the cladding interior should coolant (steam) enter through a primary defect in the cladding wall. As can be seen, the facets define channels adjacent to the fuel material 16, thereby providing axial channels for improved mixing. By improving mixing of the internal gases, the faceted design hinders formation of local pockets having high hydrogen to steam ratios, which as noted can lead to oxygen starvation and secondary hydride defects in the cladding wall.

The substrate may be made from a conventional cladding material such as a stainless steel or, preferably, a zirconium alloy. Suitable zirconium alloys for the substrate preferably include at least about 98% zirconium, up to about 0.25% iron, up to about 0.1% nickel, up to about 0.2% chromium, and up to about 1.7% tin (all percents by weight). Other alloying elements may include niobium, bismuth, molybdenum, as well as various other elements used in the art. Most generally, any zirconium alloy with suitable corrosive resistance to BWR water and with sufficient strength and ductility may be employed. In a preferred embodiment of this invention, the substrate is Zircaloy-2 or Zircaloy-4. Other suitable materials are described in U.S. patent application Ser. No. 08/092,188, previously incorporated herein by reference.

In some preferred embodiments, the substrate will have a microstructure (i.e. precipitate size distribution) that resists corrosion and/or crack propagation. It is known that the microstructure of Zircaloys and other alloys can be controlled by the anneal temperature and time as well as other fabrication parameters. It is also known that in boiling water reactors (BWRs), smaller precipitates generally provide superior resistance to corrosion while in pressurized water reactors (PWRs), larger precipitates generally provide superior resistance to corrosion. In either environment, coarse precipitates provide improved resistance to axial crack propagation. In a preferred embodiment, the substrate will have a dense distribution of fine precipitates (e.g., between about 0.01 and 0.15 micrometers in diameter) in the outer regions (radially) of the substrate and a less dense distribution of coarse precipitates (e.g., between about 0.2 and 1 micrometers in diameter) in the inner regions of the substrate. Detailed discussions of Zircaloy microstructure and methods of fabricating cladding having a desired microstructure are found in U.S. patent application Ser. No. 08/052,793 entitled ZIRCALOY TUBING HAVING HIGH RESISTANCE TO CRACK PROPAGATION and U.S. patent application Ser. No. 08/052,791 entitled METHOD OF FABRICATING ZIRCALOY TUBING HAVING HIGH RESISTANCE TO CRACK PROPAGATION, both of which were filed on Apr. 23, 1993, assigned to the assignee hereof, and are incorporated herein by reference for all purposes.

Metallurgically bonded on the inside surface of substrate 21 is the zirconium barrier 22. See the above-mentioned U.S. Pat. Nos. 4,200,492 and 4,372,817 to Armijo and Coffin, U.S. Pat. No. 4,610,842 to Vannesjo, and U.S. Pat. No. 4,894,203 to Adamson. The barrier shields the substrate from the nuclear fuel material inside the composite cladding. In effect, the zirconium barrier deforms plastically to relieve pellet-induced stresses in the fuel element. The barrier also serves to inhibit stress corrosion cracking and protects the cladding from contact and reaction with impurities and fission products. In preferred embodiments, the thickness of the barrier layer is between about 50 and 130 micrometers (approximately 2 to 5 mils) and forms between about 5% to about 30% of the thickness or cross-section of the cladding.

Generally, the zirconium barrier layer may be made from unalloyed zirconium possessing the desired structural properties. Suitable barrier layers are made from "low oxygen sponge" grade zirconium, "reactor grade sponge" zirconium, and higher purity "crystal bar zirconium". In alternative embodiments, the barrier layer is alloyed with low concentrations of alloying elements such as the chromium, nickel, and iron used in the substrate. The alloying elements and the concentrations at which they appear should be chosen to impart additional corrosion resistance to the barrier layer while maintaining compliance sufficient to prevent damage from pellet-cladding interaction.

Metallurgically bonded to the inside surface of the zirconium barrier 22 is the inner liner 23. As shown, the inner liner is the portion of the composite cladding closest to the nuclear fuel material 16. This layer protects the zirconium barrier from oxidation should the fuel element interior come in contact with steam. Thus, the inner liner should be a relatively corrosion resistant material such as Zircaloy. However, modified Zircaloys and other corrosion resistant materials may also be employed. For example, the inner liner may be softer than conventional Zircaloy so that crack initiation and propagation on the inner surface of the cladding tube are minimized. See U.S. patent application Ser. No. 08/092,188, previously incorporated herein by reference. In an alternative embodiment, the inner liner may be made from an alloy designed to have strongly hydrogen absorbing properties. One such material is a zirconium alloy having a high concentration of nickel (e.g., up to 15% nickel).

As noted, secondary defects due to hydride formation may be created in a cladding after steam enters the cladding interior through a primary defect. If the internal cladding environment thereafter supports local regions of oxygen starvation, a zirconium hydride seed may form and grow to create a secondary defect. This invention strives to prevent the local regions of oxygen starvation in at least two ways. First, it provides a well mixed cladding interior environment so that steam is available to dilute pockets having a high hydrogen to steam ratio. This is accomplished through a faceted inner liner which promotes mixing. It is also accomplished by providing steam reservoirs or plenums at the ends of the rods. Second, the invention provides a nuclear fuel that makes oxygen available to shift the cladding interior environment away from a chemical equilibrium that allows oxygen starvation. These two approaches will be discussed in turn.

As shown in FIG. 1, the inner surface of the inner layer is in the form of a many sided polygon. It is known that such structures promote mixing within the interior of a cladding tube. This occurs because during operation, the roughly triangular channels created between the apexes of the polygonal inner surface of the cladding and the cylindrical fuel pellets remain open. These channels, together with the ring-shaped volumes of the pellet chamfers, form an uninterrupted gas communication grid throughout the fuel, even when the fuel and cladding are in hard contact.

Figure 2:
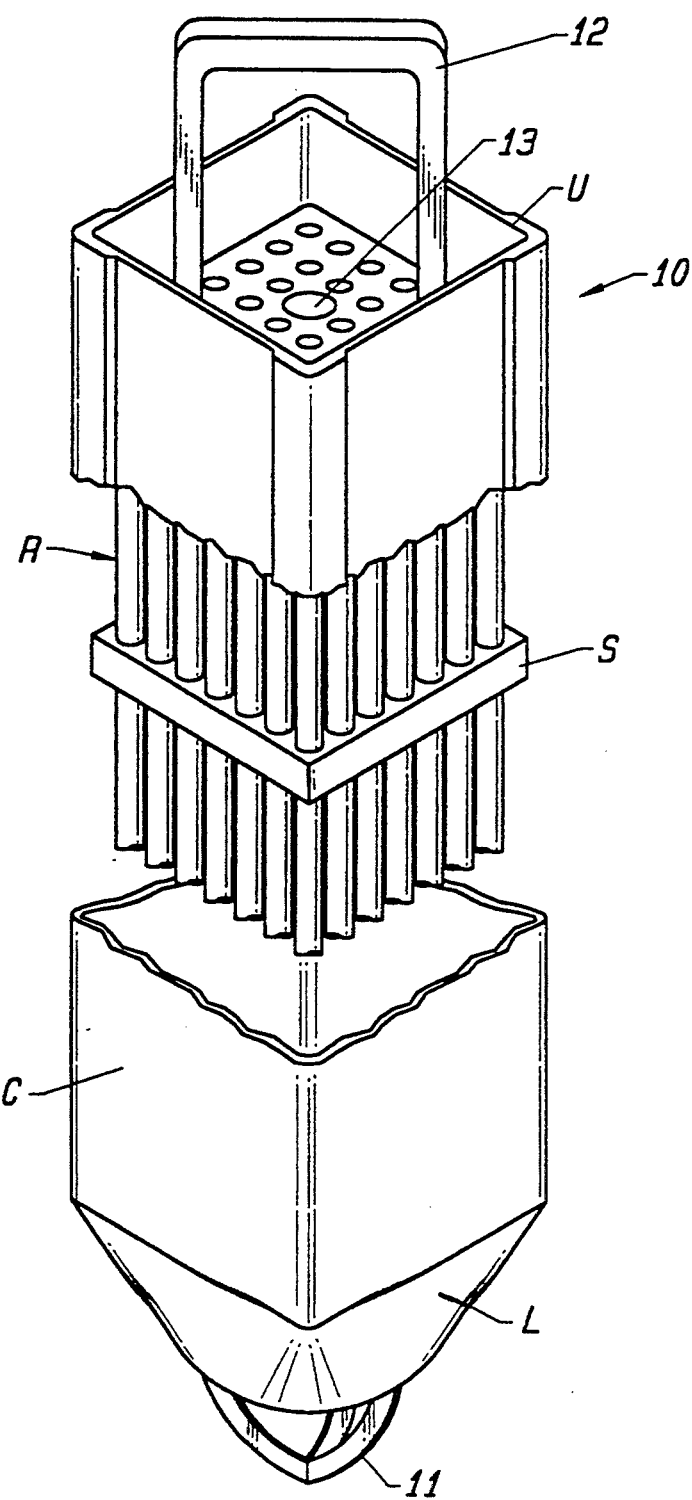
FIG. 2 is a partial cutaway perspective view of a nuclear fuel bundle containing a nuclear fuel rod.

Referring now to FIG. 2, a cutaway sectional view of a nuclear fuel bundle or assembly 10 is shown. The fuel bundle is a discrete unit of fuel containing many individual sealed fuel elements or rods R each containing a cladding tube of this invention. In addition, the fuel bundle consists of a flow channel C provided at its upper end with an upper lifting bale 12 and at its lower end with a nose piece L and lower lifting bale 11. The upper end of channel C is open at 13 and the lower end of the nose piece is provided with coolant flow openings. The array of fuel elements or rods R is enclosed in channel C and supported therein by means of upper tie plate U and lower tie plate (not shown). Certain of the fuel rods serving to "tie" the tie plates together—thus frequently being called "tie rods" (not shown). In addition, one or more spacers S may be disposed within the flow channel to hold the fuel elements in alignment with one another and the flow channel. During the in service life of the fuel bundle, the liquid coolant ordinarily enters through the openings in the lower end of the nose piece, passes upwardly around fuel elements R, and discharges at upper outlet 13 in partially vaporized condition.

Figure 3:
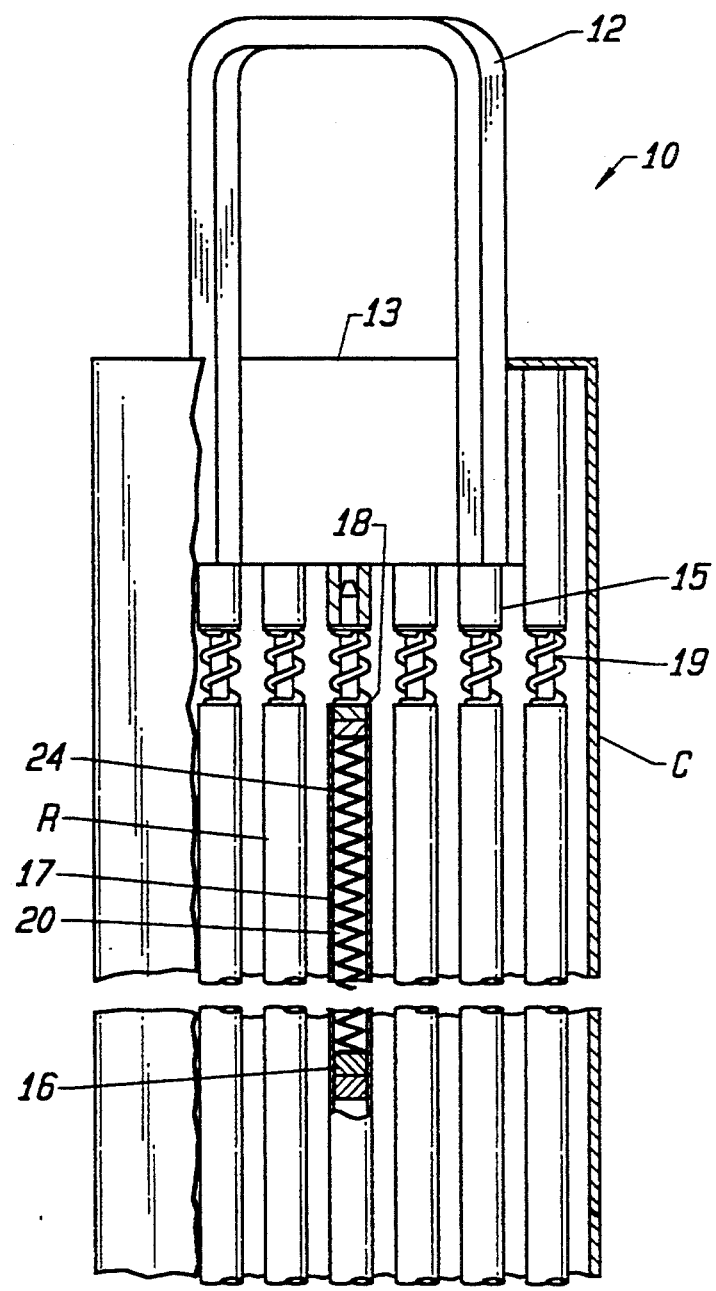
FIG. 3 is a partial cutaway sectional view of a nuclear fuel bundle showing the interior of a fuel rod.

Referring now to FIG. 3, the fuel elements or rods R are sealed at their ends by end plugs 18 welded to the fuel rod container 17, which may include studs 19 to facilitate the mounting of the fuel element in the fuel assembly. A nuclear fuel material retainer 24 in the form of a helical member is positioned within space 20 to provide restraint against axial movement of the pellet column during handling and transportation of the fuel element. In preferred embodiments, the fuel or pellet column resides in a central region of the cladding interior disposed between the two end regions or plenums.

A void space or plenum 20 is shown at one end of the element. In preferred embodiments, both ends of the element will have void spaces or plenums. In conventional elements, the single plenum was provided to permit longitudinal expansion of the fuel material 16 and accumulation of gases released by the fuel material. In this invention, the plenum (or plenums) also serve as steam reservoirs in the event that a cladding breach occurs and steam is allowed to enter the cladding interior. Keeping with the goal of decreasing the hydrogen to steam molar ratio, the presence of steam reservoirs provides a buffer near the ends of the fuel region to offset any excess hydrogen production in these regions. As noted, the hydrogen to steam molar ratio is often greatest near the end regions of the cladding tube interior, away from the typical primary defect region near the center of the cladding. Thus, the steam reservoirs are provided in the regions where they are needed most.

In some fuel elements, a getter is provided in the plenum to remove adventitious hydrogen introduced into the fuel element during manufacture. Usually, the getter is a zirconium alloy containing high concentrations of alloying elements such as nickel and titanium. Typically, the getter is provided within the plenum and contained in a tube and is held in place with gauze plugs. In preferred embodiments of this invention, no getter is used as it would take up space that could advantageously be used to hold hydrogen-diluting steam. It is also preferred to not use getters because they can become a net hydrogen producer in the event of a primary defect allowing steam to enter the cladding interior.

The inventive features discussed thus far have focused on promoting mixing of hydrogen and steam within the cladding interior. However, another aspect of this invention strives to make more oxygen chemically available to the cladding interior, and thereby reduce the incidence of oxygen starvation. This is accomplished by providing a nuclear fuel that has a hyper-stoichiometric amount of oxygen. Normally, uranium oxide and mixed uranium-plutonium oxide fuels (to name two examples) contain a molar ratio of 2:1 oxygen to metal. In other words, these fuels have chemical formulas given by $UO_2$ and $(U,Pu)O_2$, respectively. When these fuels contain additional oxygen (beyond the "normal" 2:1 stoichiometry), that additional oxygen becomes chemically available to the cladding interior to reduce the danger of oxygen starvation. It has been determined that a fuel stoichiometry suitable for this invention is about 2 to 2.2 oxygen to uranium.

However, the efficiency of fuel is optimal at the normal 2:1 stoichiometry. As the fuel stoichiometry is biased more heavily toward oxygen, the fuel efficiency decreases. One reason this occurs is the negative effect that excess oxygen has on the thermal conductivity of a fuel. Another mason is the negative effect that excess oxygen has on the melting point of a fuel. Fuels that have hyper-stoichiometric amounts of oxygen have lower thermal conductivities and lower melting temperatures than stoichiometric fuel compositions. In view of these observations, a preferred fuel stoichiometry is between about 2.02 to 2.06 oxygen to uranium. More preferably, the stoichiometry is about 2.04. Comparable stoichiometries may be employed with other nuclear fuels such as mixed uranium-plutonium oxide and mixed uranium-gadolinium oxide (to name two examples).

It is known that fuel performance depends most critically on the quality of the fuel near the center axial region of the pellet colunto. Fuel disposed closer to the ends of the pellet column has a less pronounced effect on the fuel performance and can, in fact, be natural or depleted uranium oxide. Thus, if the fuel region of the cladding interior (i.e., where the fuel pellets reside) is divided along the axis of the cladding tube into three subregions—two fuel end regions and a center region—the center region should be filled with the highest quality fuel. One aspect of this invention therefore provides a fuel region in which the two end fuel regions are filled with a hyper-oxygen stoichiometry fuel and the inner region is filled with a normal stoichiometry fuel. While this approach is sensible from the standpoint of fuel performance, it is also sensible from the standpoint of hydride prevention.

In some preferred embodiments, it will be desirable to include diffusion barriers or spacers between the hyper-oxygen stoichiometry fuel in the two end fuel regions and the normal stoichiometry fuel in the center region. These bamers will prevent the excess oxygen in the nonstoichiometric nuclear fuel from diffusing to and thereby contaminating the stoichiometric nuclear fuel. Materials having suitable barrier properties are well known to those of skill in the art. One such material is a ceramic plug or disk formed of alumina.

II. MANUFACTURE OF THE TUBING

Various methods can be used to fabricate the cladding tubes of this invention. Suitable methods should produce a metallurgical bond between the substrate and the metal barrier and between the metal barrier and the inner liner. Typically, the barrier and inner liner are provided as cylindrical tubes or sleeves that are bonded to the inside surface of a hollow zirconium alloy billet (which forms the substrate in the final cladding). Preferably, the components are bound to one another by coextrusion, but other methods may be employed. For example, the components can also be bonded to the billet by hot isostatic pressing or explosive bonding. In another method, the barrier and inner liner sleeves are bonded to the billet inner surface by heating (such as at 750° C. for 8 hours) to give diffusion bonding between the tubes and the billet. Prior to bonding (by, for example, extrusion), the bamer and inner liner sleeves preferably are joined to the billet at their ends by a bonding process such as electron beam welding in a high vacuum. Electron beam welding is a conventional process in which an electron beam is used to heat the ends of the cylindrical tubes until they fuse.

Extrusion is accomplished by puffing the tube through a set of tapered dies under high pressure at about 1000° to 1400° F. (about 538° to 760° C.). Suitable extruders are available from Mannessmann Demang, Coreobolis, Pa. After extrusion, the composite is subjected to conventional annealing and tube reduction processes to produce a product known as a "tubeshell" which is available in specified dimensions and compositions from various vendors such as Teledyne Wahchang (Albany, Oreg. USA), Western Zirconium (A Westinghouse company of Ogden, Utah), and Cezus (France).

To obtain the final tubing of the necessary dimensions, various manufacturing steps such as cold-working, heat treating, and annealing may be employed. The equipment and operating conditions necessary to carry out these various steps will be readily apparent to those of skill in the art, and are described in U.S. patent application Ser. No. 08/091,672 entitled METHOD FOR MAKING FUEL CLADDING HAVING ZIRCONIUM BARRIER LAYERS AND INNER LINERS and previously incorporated by reference. One suitable method of tube reduction involves three passes of about 65 to 80% cold work (conducted with a Pilger mill) followed in each case by a stress relief or recrystallization anneal.

A specific preferred process according to this invention is now described. It should be understood that although the conditions described in this example are quite specific, each step of the process could be conducted under a range of conditions. The process is started with a hollow Zircaloy billet of approximately six to ten inches in diameter and two feet in length. The billet will form the substrate of a structure by the end of the process. At that point, the billet will be converted to about 400 feet of tubing having about a one-half inch outer diameter.

First, the billet is rapidly quenched. Generally, the quench involves heating the billet above about 1000° C., and then rapidly cooling from 1000° C. to about 700° C. by immersion in a tank of water. Maintaining a proper quench rate is important in the temperature range between 1000° C. and 700° C; after 700° C. is reached, however, the rate of cooling can be increased or decreased as desired.

After quenching, a tube of the metal selected to be the zirconium barrier and a tube of the material selected to be the inner liner are concentrically inserted into the hollow billet. The ends of the billet, barrier, and inner liner tubes are then bonded by electron beam welding as described above. The welded tube is extruded at a tube temperature of about 570° C. to produce a tube having a diameter of about 3 inches. The extruded tube is further annealed and cold worked to produce a tubeshell of about 2.5 inches in diameter.

The tubeshell—which now has a zirconium barrier and inner liner bonded therein—is subjected to three cold work passes in a pilger mill. It will be understood by the reader that pilger mills are generally available, albeit fairly complicated, pieces of equipment. During cold working with a pilger mill, a shaped die is rolled on the outside of the tube while a hard tapered mandrel supports the inside of the tube. In this manner, the wall thickness and diameter of the tube are simultaneously reduced.

The first pass cold work step is typically performed to about 69%. This percent value is roughly analogous to the percent reduction of the wall thickness. If the tube is given too much cold work in a single pass without stress relief, it will likely crack during manufacture. To relieve the stress caused by cold working, the tube is annealed at about 593° C. for two hours in a large vacuum annealing furnace such as is available from Centorr Vacuum Industries, located in Nashua, N.H.

Next, the tube is heat treated at about 927° C. on the outer 30% of the wall. This is accomplished by heating the tubeshell with a high-energy or frequency (from an induction coil) which penetrates about 33% of the wall. During the induction heating water flows through the tube center. This serves two purposes: first it maintains the interior of the tube at a lower temperature while the outer region is heated, and second it very rapidly quenches the entire tube when the heating energy is removed. It is important to recognize that the inner portion of the tubeshell is not substantially heated. Further details of the induction heating process are provided in U.S. Pat. No. 4,576,654 to Eddens which is incorporated herein by reference for all purposes. This selective heating step imparts corrosion resistance to the outer region of the substrate by producing fine precipitates therein.

At this point, a second pass cold work is performed (this time to about 74%) with a pilger mill. To remove the stress induced by this second pass cold work step, another anneal (again at 593° C. for about 2 hours) is performed. Finally, the third pass cold work is performed as before. This reduces the tube to its final size—about one-half inch outer diameter with a nominal wall thickness of roughly 30 mils.

Cladding tubes with a faceted interior surface of this invention could be manufactured by methods including using a faceted hard tapered mandrel in the last pass of the pilgering process. During this pass, the indexing of the angular rotation of the tube through the pilger pass would have to be adjusted to match the number of facets on the mantel and to form continuous facets along the inner surface of the cladding.

This tube is cut up into lengths for fuel rods (i.e. about 14 feet long) and given a final recrystallization anneal at 577° C. for about two hours. Alternatively, the final anneal could be a stress relief anneal conducted at any temperature between about 480° C. to 577° C. After the final anneal, the tube is ready for use in the reactor.

It will be recognized by those of skill in the art that various steps are performed in addition to those listed in the above. For example, chemical etching is employed to remove superficial defects caused by the tube reduction mill. Further, straightening of tubes is often performed with pieces of equipment designed for this purpose. In addition, various nondestructive tests such as corrosion tests and ultrasonic tests for crack imperfections in the surface axe performed. This is not an exhaustive list, but merely serves to describe some steps which may be employed.

The resulting composite tubing can be used to make nuclear fuel elements of this invention by first affixing a closure to one end of the tubing so that only one open end remains. The completed fuel element is prepared by filling the cladding container with nuclear fuel material (with any diffusion barriers and non-stoichiometric fuels inserted as necessary) between nuclear fuel material retaining means or spacers necessary to define plenums at the end regions of the cladding, evacuating the cladding interior, pressurizing the interior with helium, applying a closure to the open end of the container leaving the cavity, and then bonding the end of the cladding container to the closure to form a tight seal therebetween.

III. CONCLUSION

Although the foregoing invention has been described in some detail for purposes of clarity of understanding, it will be apparent that certain changes and modifications may be practiced within the scope of the appended claims. For instance, although the specification has described non-stoichiometric uranium dioxide as fuel material, other nonstoichiometric fuel materials may be used as well. For example, hyper-oxygen stoichiometric mixed uranium-plutonium dioxides, mixed uranium-thorium dioxides, and mixed uranium-gadolinium dioxides.

What is claimed is:

1. A cladding tube having an axis and a cross-section defining inner and outer circumferential surfaces, the cladding tube comprising:

an outer circumferential substrate having an inner surface;

a zirconium barrier layer bonded to the inner surface of the outer circumferential substrate and itself having an inner surface; and an inner circumferential liner bonded to the inner surface of the zirconium barrier layer, wherein the inner circumferential surface includes a plurality of facets aligned substantially in parallel with the cladding tube axis.

2. The cladding tube of claim 1 wherein the inner circumferential surface further comprises a plurality of grooves.

3. The cladding tube of claim 1 wherein the inner liner comprises a Zircaloy or modified Zircaloy.

4. A fuel element comprising:
(a) a cladding tube having an axis and an interior, the interior having a circumferential surface, two end regions, and a fuel region disposed between the two end regions, the cladding also including the following:
 (i) an outer circumferential substrate having an inner surface,
 (ii) a zirconium barrier layer metallurgically bonded to the inner surface of the outer circumferential substrate and itself having an inner surface, and
 (iii) an inner circumferential liner of zirconium alloy bonded to the inner surface of the zirconium barrier layer, wherein the interior circumferential surface includes a plurality of facets aligned substantially in parallel with the cladding tube axis;
(b) nuclear fuel material disposed within said cladding tube in the fuel region; and
(c) a plenum located in one of the end regions within the cladding tube, wherein the plenum serves as a steam reservoir in the event that steam enters the cladding tube interior.

5. The fuel element of claim 4 further comprising a second plenum located at the end region opposite the end region in which the plenum is located in step (c), the second plenum serving as a steam reservoir in the event that steam enters the cladding tube interior.

6. The fuel element of claim 4 wherein at least a portion of the nuclear fuel material comprises a uranium dioxide having a stoichiometric excess of oxygen.

7. The fuel element of claim 6 wherein the portion of the nuclear fuel having the stoichiometric excess of oxygen has an oxygen to uranium mole ratio of at most about 2.2.

8. The fuel element of claim 7 wherein the portion of the nuclear fuel having the stoichiometric excess of oxygen has an oxygen to uranium mole ratio of between about 2.02 and 2.06.

9. The fuel element of claim 6 wherein the fuel region of said cladding interior is divided into three regions along the cladding axis, including two fuel end regions filled with nuclear fuel having a stoichiometric excess of oxygen, and a central region disposed between the two end regions, the central region being filled with stoichiometric nuclear fuel.

10. A fuel element comprising:
(a) a cladding tube having an axis and an interior, the interior having two end regions and a fuel region disposed between, in an axial sense, the two end regions, the fuel region being further divided into two fuel end regions and a central region disposed between, in an axial sense, the two fuel end regions; and
(b) nuclear fuel material disposed within said cladding tube interior in the fuel region such that nuclear fuel having a stoichiometric excess of oxygen fills the two fuel end regions, and stoichiometric nuclear fuel fills the central region, wherein the nuclear fuel having a stoichiometric excess of oxygen has an oxygen to metal ratio of at most about 2.2:1.

11. The fuel element of claim 10 wherein the nuclear fuel material having the stoichiometric excess of oxygen has an oxygen to uranium mole ratio of between about 2.02:1 and 2.06:1.

12. The fuel element of claim 10 wherein the stoichiometric nuclear fuel is separated from the nuclear fuel having a stoichiometric excess of oxygen by one or more barriers that block diffusion of oxygen between the nuclear fuel in the central region and nuclear fuel in the two fuel end regions.

13. The fuel element of claim 12 wherein the barriers comprise alumina.

14. The fuel element of claim 10 wherein the two end regions of the cladding interior comprise plenums serving as steam reservoirs in the event that steam enters the cladding tube interior.

15. A nuclear fuel bundle comprising:
(a) a lower tie plate for supporting an upstanding matrix of fuel rods and permitting the entry of water moderator;
(b) an upper tie plate and permitting the exit of water and generated steam moderator;
(c) a plurality of fuel rods, said fuel rods including a cladding tube having an axis and an interior, the interior having a circumferential surface two end regions and a fuel region disposed between the two end regions, the cladding also including the following:
 (i) an outer circumferential substrate having an inner surface,
 (ii) a zirconium barrier layer metallurgically bonded to the inner surface of the outer circumferential substrate and itself having an inner surface,
 (iii) an inner circumferential liner of zirconium alloy bonded to the surface of the zirconium barrier layer, wherein the interior circumferential surface includes a plurality of facets aligned substantially in parallel with the cladding tube axis, and
 (iv) nuclear fuel material disposed within said cladding tube in the fuel region; and
(d) one or more spacers disposed within said fuel bundle at varying elevations on said fuel bundle, said spacers surrounding and holding said array of fuel elements in designed center to center spacing; and
(e) means for tying said upper and lower tie plates together.

16. The nuclear fuel bundle of claim 15 wherein the two end regions of the cladding interior comprise plenums serving as steam reservoirs in the event that steam enters the cladding tube interior.

17. The fuel element of claim 15 wherein at least a portion of the nuclear fuel material comprises a uranium dioxide having a stoichiometric excess of oxygen.

* * * * *